US008605645B2

(12) United States Patent
Oh et al.

(10) Patent No.: US 8,605,645 B2
(45) Date of Patent: Dec. 10, 2013

(54) APPARATUS AND METHOD FOR TRANSMITTING AND RECEIVING CONTROL INFORMATION IN MULTI-HOP RELAY BROADBAND WIRELESS COMMUNICATION SYSTEM

(75) Inventors: Chang-Yoon Oh, Yongin-si (KR); Taori Rakesh, Suwon-si (KR); Jung-Je Son, Seongnam-si (KR); Hyoung-Kyu Lim, Seoul (KR); Sung-Jin Lee, Seoul (KR); Young-Bin Chang, Anyang-si (KR); Hyun-Jeong Kang, Seoul (KR)

(73) Assignee: Samsung Electronics Co., Ltd (KR)

( * ) Notice: Subject to any disclaimer, the term of this patent is extended or adjusted under 35 U.S.C. 154(b) by 990 days.

(21) Appl. No.: 12/037,496

(22) Filed: Feb. 26, 2008

(65) Prior Publication Data
US 2008/0207193 A1    Aug. 28, 2008

(30) Foreign Application Priority Data

Feb. 26, 2007   (KR) .............................. 2007-0019029

(51) Int. Cl.
*H04B 7/212* (2006.01)

(52) U.S. Cl.
USPC ........... 370/322; 370/337; 370/347; 370/442; 370/492; 370/498

(58) Field of Classification Search
USPC .................. 370/321, 337, 347, 472, 492, 498
See application file for complete search history.

(56) References Cited

U.S. PATENT DOCUMENTS

| 2004/0166853 | A1* | 8/2004 | Takeda et al. ................. 455/434 |
| 2005/0281350 | A1* | 12/2005 | Chae et al. .................... 375/267 |
| 2006/0046643 | A1* | 3/2006 | Izumikawa et al. ............... 455/7 |
| 2007/0110016 | A1* | 5/2007 | Shen et al. .................... 370/338 |
| 2008/0031180 | A1* | 2/2008 | Hsieh et al. ................... 370/315 |
| 2008/0062904 | A1* | 3/2008 | Tzu-Ming ..................... 370/312 |
| 2008/0165881 | A1* | 7/2008 | Tao et al. ..................... 375/267 |
| 2009/0296668 | A1* | 12/2009 | Capone et al. ................. 370/337 |
| 2009/0303918 | A1* | 12/2009 | Ma et al. ...................... 370/315 |

FOREIGN PATENT DOCUMENTS

| EP | 1 608 081 | 12/2005 |
| KR | 100856045 | 8/2008 |

OTHER PUBLICATIONS

Hart et al.: "Frame Structure for Multihop Relaying Support", IEEE 802.16 Broadband Wireles Access Working Group, Nov. 7, 2006.
Oh et al.: "Frame Structure for 2-hop Relay", IEEE 802.16 Broadband Wireless Access Working Group, Nov. 7, 2006.
Leng et al.: "A Frame Structure for Mobile Multi-hop Relay with Different Carrier Frequencies", Nov. 11, 2005.

* cited by examiner

*Primary Examiner* — Alvin Zhu
(74) *Attorney, Agent, or Firm* — The Farrell Law Firm, P.C.

(57) ABSTRACT

An apparatus and method for transmitting control information to a Relay Station (RS) in a multi-hop relay broadband wireless communication system is disclosed. The apparatus includes a generator, a controller, and a communication unit. The generator generates control information to be transmitted to a lower RS. The controller controls and transmits the control information during a first relay link transmission interval among at least one relay link transmission interval distributed within a frame. The communication unit transmits the control information to the lower RS.

29 Claims, 8 Drawing Sheets

APPARATUS AND METHOD FOR TRANSMITTING AND RECEIVING CONTROL INFORMATION IN MULTI-HOP RELAY BROADBAND WIRELESS COMMUNICATION SYSTEM

PRIORITY

This application claims priority under 35 U.S.C. §119(a) to a Korean Patent Application filed in the Korean Intellectual Property Office on Feb. 26, 2007 and assigned Serial No. 2007-19029, the contents of which are herein incorporated by reference.

BACKGROUND OF THE INVENTION

1. Field of the Invention

The present invention relates generally to a multi-hop relay broadband wireless communication system, and in particular, to an apparatus and method for transmitting control information to a Relay Station (RS) in a multi-hop relay broadband wireless communication system.

2. Description of the Related Art

In general, a mobile communication system performs communication via one direct link between a Base Station (BS) and a Mobile Station (MS) and therefore, can easily configure a wireless communication link with high reliability between the MS and the BS. However, it is difficult to provide an efficient service in radio environments where traffic distribution or telephony demand quantity is greatly varied because the flexibility of wireless network configuration is low due to a fixed position of the BS.

In order to provide a solution to this disadvantage, $4^{th}$-Generation (4G) mobile communication systems are considering the introduction of a multi-hop relay technique to forward data in a multi-hop fashion using several neighboring MSs or RSs. With the introduction of the multi-hop relay technique, the system can reconfigure a network quickly in response to the change of the neighboring environments and manage the whole wireless network more efficiently. Further, the system can provide a radio channel having a better channel state to an MS by installing an RS between a BS and the MS and configuring a multi-hop relay path via the RS according to the multi-hop relay technique. Furthermore, the system expands cell coverage by providing a high-speed data channel to an MS within a shadow area where communication with the BS is impossible, using the multi-hop relay path.

Figure 1:
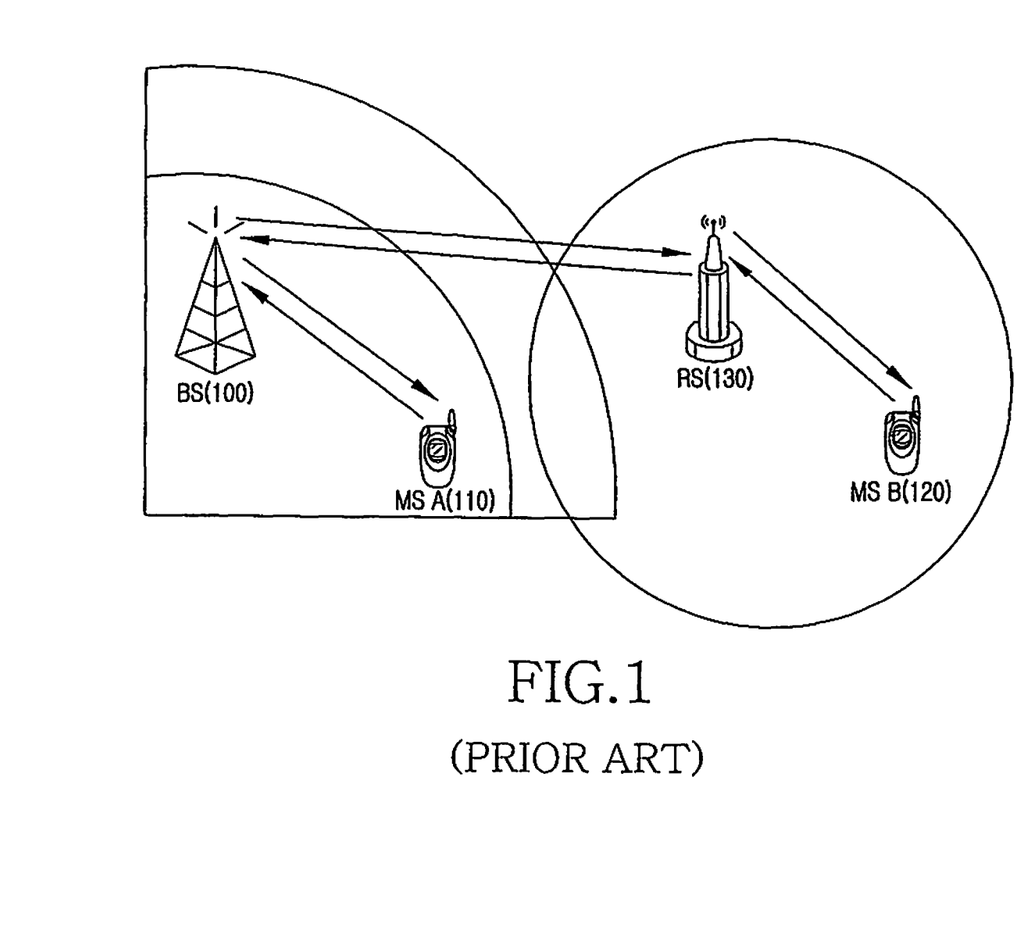
FIG. 1 is a diagram illustrating a schematic construction of a conventional multi-hop relay broadband wireless communication system.

FIG. 1 shows a construction of a conventional multi-hop relay broadband wireless communication system. As shown in FIG. 1, a BS 100 connects with an MS A 110 located in a service area via a direct link. Alternatively, the BS 100 connects with an MS B 120 located outside the service area that has a poor channel state, through an RS 130 via a relay link.

That is, the BS 100 can provide a better radio channel to the MS B 120 using the RS 130 if the MS B 120 is located outside the service area that has a poor channel state or in a shadow area around a building. Accordingly, the BS 100 can provide a high-speed data channel to a cell boundary area in which a channel state is poor, using the multi-hop relay technique, and can expand cell coverage. At this time, the broadband wireless communication system relays a signal between the BS and the MS using the RS. Therefore, the broadband wireless communication system configures not only a BS and MS link but also a BS and RS link and an RS and MS link.

Figure 2:
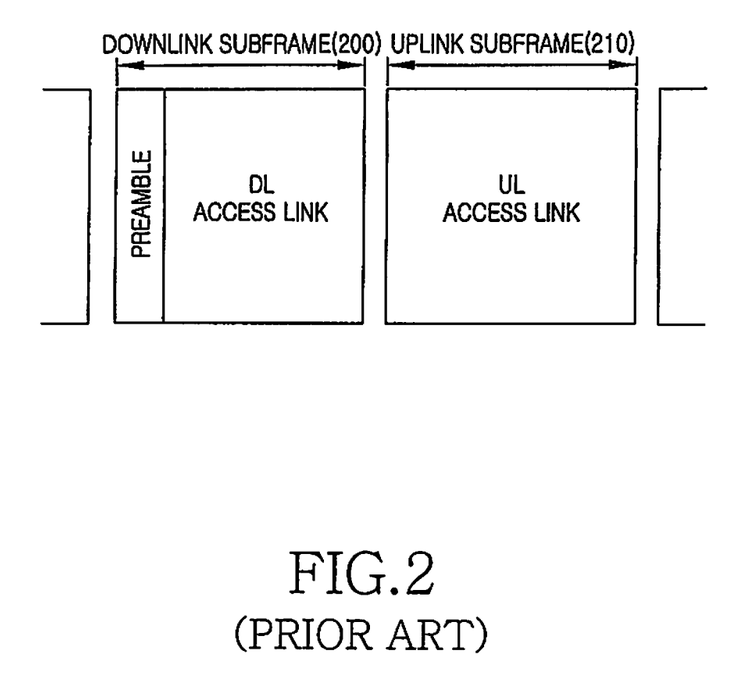
FIG. 2 is a diagram illustrating a frame structure of a broadband wireless communication system according to the prior art.

The conventional broadband wireless communication system using a frame of a structure of the Institute of Electrical and Electronics Engineers (IEEE) 802.16e is shown in FIG. 2.

Referring to FIG. 2, the frame includes a downlink subframe 200 and an uplink subframe 210. The downlink subframe 200 includes a preamble and a DownLink (DL) access link. The preamble is for an MS to acquire frame synchronization from a BS. The DL access link is for the BS to transmit a signal to the MS. The uplink subframe 210 includes an UpLink (UL) access link for the MS to transmit a signal to the BS. However, there is no frame interval for an RS to transmit a signal under the conventional scheme.

As described above, the frame structure of the conventional broadband wireless communication system allocates resources for the BS and MS link only. Thus, in order for the broadband wireless communication system to use a multi-hop relay technology, there is needed a frame structure that is capable of allocating resources to not only the BS and MS link but also the BS and RS link and the RS and MS link.

SUMMARY OF THE INVENTION

An aspect of the present invention is to substantially solve at least the above problems and/or disadvantages and to provide at least the advantages below. Accordingly, one aspect of the present invention is to provide an apparatus and method for supporting a relay service in a multi-hop relay broadband wireless communication system.

Another aspect of the present invention is to provide an apparatus and method for transmitting control information to an RS in a multi-hop relay broadband wireless communication system.

The above aspects are achieved by providing an apparatus and method for transmitting and receiving control information in a multi-hop relay broadband wireless communication system.

According to one aspect of the present invention, there is provided a Relay Station (RS) apparatus in a multi-hop relay broadband wireless communication system. The apparatus includes a generator, a controller, and a communication unit. The generator generates control information to be transmitted to a lower RS. The controller controls and transmits the control information during a first relay link transmission interval among at least one relay link transmission interval distributed within a frame. The communication unit transmits the control information to the lower RS.

According to another aspect of the present invention, there is provided an RS apparatus in a multi-hop relay broadband wireless communication system. The apparatus includes a communication unit, a controller, and an identifier. The communication unit converts a signal received from an upper RS into an information bit stream. The controller classifies control information from a received signal during a first relay link reception interval among at least one relay link reception interval distributed within a frame. The identifier identifies the control information.

According to a further aspect of the present invention, there is provided a communication method of an RS in a multi-hop relay broadband wireless communication system. The method includes generating control information to be transmitted to a lower RS; identifying whether it is a first relay link transmission interval among at least one relay link transmission interval distributed within a frame; and transmitting the control information to the lower RS during the first relay link transmission interval.

According to still another aspect of the present invention, there is provided a communication method of an RS in a multi-hop relay broadband wireless communication system. The method includes converting a signal received from an upper RS into an information bit stream; identifying whether it is a first relay link reception interval among at least one relay link reception interval distributed within a frame; and acquiring control information from a received signal during the first relay link reception interval.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be provided herein below with reference to the accompanying drawings. In the following description, well-known functions or constructions are not described in detail since they would obscure the invention in unnecessary detail.

A technology for supporting a relay service in a multi-hop relay broadband wireless communication system according to the present invention is provided below. In particular, a technology for transmitting control information to an RS in a multi-hop relay broadband wireless communication system according to the present invention is provided. The present invention provides, for example, an Orthogonal Frequency Division Multiplexing (OFDM) wireless communication system but is also applicable to other wireless communication systems.

Figure 3A:
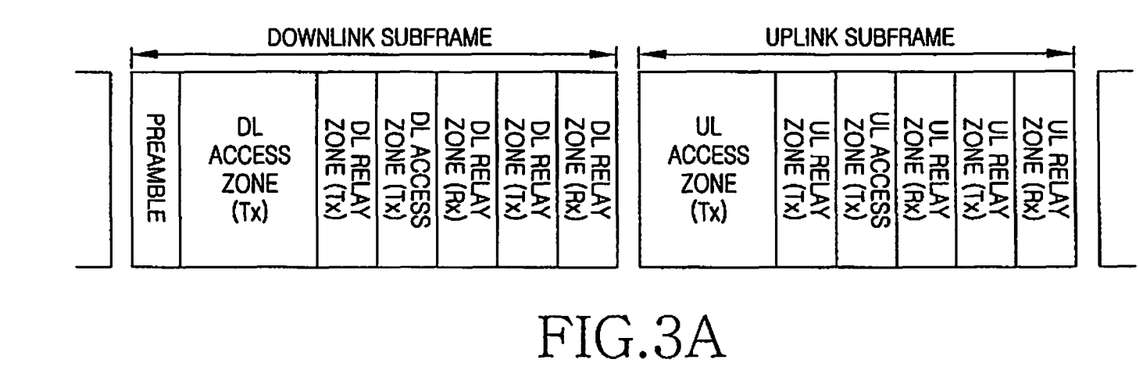
FIGS. 3A and 3B are diagrams illustrating a frame structure of a multi-hop relay broadband wireless communication system according to an embodiment of the present invention.
Figure 3B:
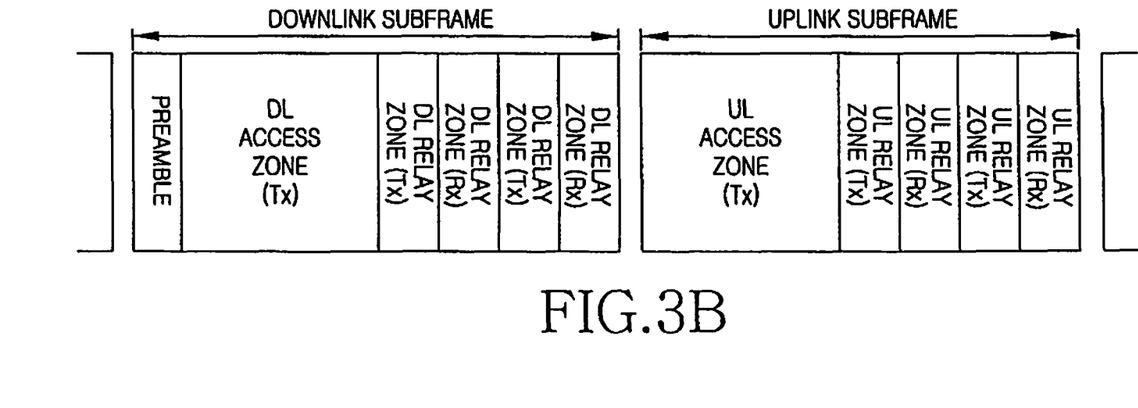

A multi-hop relay broadband wireless communication system according to the present invention uses a frame of a structure as shown in FIGS. 3A and 3B. FIGS. 3A and 3B show frame structures of a Time Division Duplex (TDD) mode. A similar frame structure can be used in a different duplex mode.

Referring to FIGS. 3A and 3B, the frame includes a DL subframe and a UL subframe. Frame configuration information of FIGS. 3A and 3B is identified through signaling with an upper RS or a BS at the time of initial connection to the upper RS or the BS. The frame configuration information includes relay interval configuration information, that is, information necessary for frame management such as information on a start point, a length of a relay interval, and a transmission mode, a reception mode, and an idle mode of the relay interval.

In FIGS. 3A and 3B, the DL subframe includes a preamble for frame synchronization, a DL access zone for downlink communication with an MS, and a plurality of DL relay zones for communication with an RS. The DL relay zones are classified into transmission zones (TX) and reception zones (RX). Though not shown in FIGS. 3A and 3B, there can also have an idle zone among the DL relay zones. Among the DL relay zones, the transmission zone (TX) is a zone for transmitting a signal to a lower RS and the reception zone (RX) is a zone for receiving a signal from an upper RS or a BS. The idle zone is a zone where the transmission and the reception operations are not performed.

The UL subframe includes a UL access zone for uplink communication with an MS and a plurality of UL relay zones for communication with an RS. Similarly with the DL relay zones, the UL relay zones are classified into transmission zones (TX) and reception zones (RX). Though not shown in FIGS. 3A and 3B, there can also have an idle zone among the UL relay zones. Among the UL relay zones, the transmission zone (TX) is a zone for transmitting a signal to an upper RS or a BS and the reception zone (RX) is a zone for receiving a signal from a lower RS. The idle zone is a zone where the transmission and the reception operation are not performed.

According to the embodiments of the present invention, the DL access zone and the UL access zone can be divided and distributed as a plurality of zones within one frame as shown in FIG. 3A or can also be distributed as a single zone within one frame as shown in FIG. 3B.

A description of a relay communication method using a frame structure of FIG. 3A according to the present invention is made below.

Figure 4:
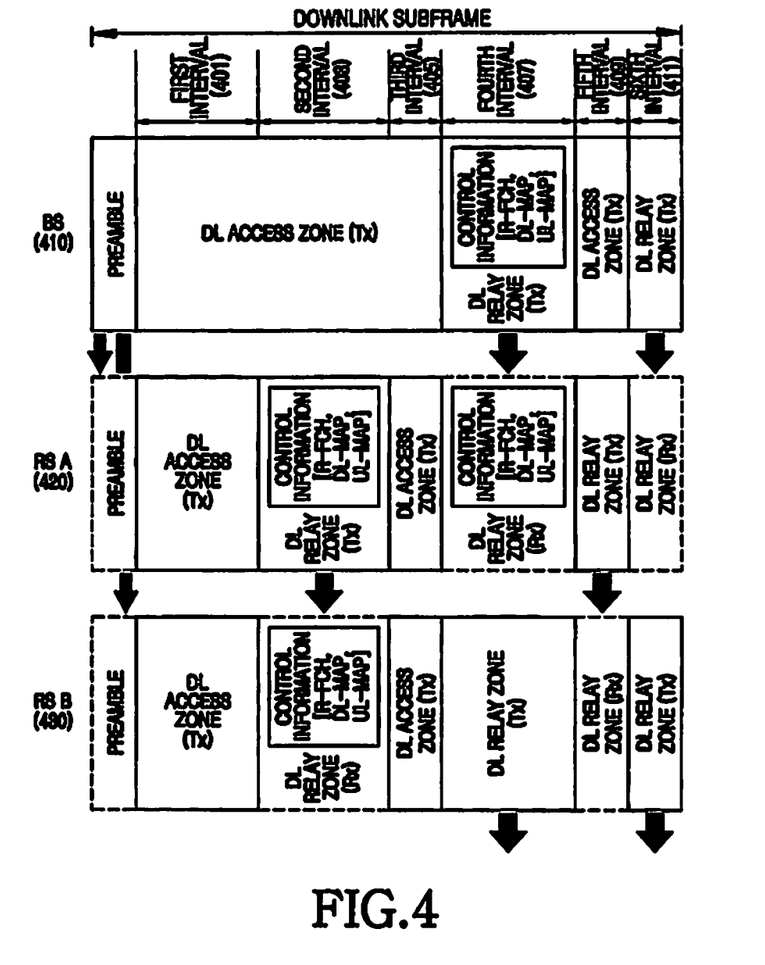
FIG. 4 is a diagram illustrating frame use between a BS and an RS in a multi-hop relay broadband wireless communication system according to an embodiment of the present invention.

FIG. 4 is a diagram illustrating frame use between a BS and an RS in a multi-hop relay broadband wireless communication system according to an embodiment of the present invention.

Referring to FIG. 4, an RS A 420 and an RS B 430 acquire frame synchronization using a preamble received from a BS 410. A first interval 401 is an MS link interval. During the first interval 401, the BS 410, the RS A 420, and the RS B 430 transmit a signal to an MS that is directly communicating with them via a single hop link.

A second interval 403 is an MS link interval for the BS 410, a relay link transmission interval for the RS A 420, and a relay link reception interval for the RS B 430. Thus, during the second interval 430, the BS 410 transmits a signal to an MS, the RS A 420 transmits a signal to the RS B 430, and the RS B 430 receives a signal from the RS A 420. The signal forwarded from the RS A 420 to the RS B 430 includes control information for the RS B 430. The control information includes a Relay-Frame Control Header (R-FCH) representing coding information of a relay MAP, a DownLink MAP (DL-MAP) representing downlink resource information, and an UpLink MAP (UL-MAP) representing uplink resource information.

That is, the RS A 420 transmits control information for the RS B 430, which is a lower RS during a first relay link transmission interval within a frame. The RS B 430 receives the control information from the RS A 420, which is an upper RS during a first relay link reception interval within a frame.

A control information transmission/reception time point is predefined between respective RSs. The RS A 420 and the RS B 430 can be aware of a control information transmission/reception interval even without separate signaling. Thus, an overhead for informing a control information transmission/reception time point is not needed. Further, the RS B 430 can use all resources of relay link reception intervals within a corresponding frame with reference to MAP information received during the first relay link reception interval. In other words, an upper RS can allocate relay zone resources within the same frame through transmitting a DL-MAP for a relay interval during a first relay link transmission interval and receiving the DL-MAP during a first relay link reception interval. Similarly, a lower RS receives the DL-MAP and decodes a signal of a relay zone instructed by the DL-MAP.

A third interval 405 is an MS link interval. During the third interval 405, the BS 410, the RS A 420, and the RS B 430 transmit a signal to an MS directly communicating with them.

A fourth interval 407 is a relay link transmission interval for the BS 410 and the RS B 430 and a relay link reception interval for the RS A 420. Thus, during the fourth interval 407, the BS 410 transmits a signal to the RS A 420, the RS A 420 receives a signal from the BS 410, and the RS B 430 transmits a signal to a lower RS. The fourth interval 407 is the first relay link reception interval for the RS A 420 and therefore, the RS A 420 receives control information. Also, the fourth interval 407 is the first relay link transmission interval for the RS B 430 and therefore, the RS B 430 transmits control information for a lower RS.

A fifth interval 409 is an MS link interval for the BS 410, a relay link transmission interval for the RS A 420, and a relay link reception interval for the RS B 430. Thus, during the fifth interval 409, the BS 410 transmits a signal to an MS, the RS A 420 transmits a signal to the RS B 430, and the RS B 430 receives a signal from the RS A 420.

A sixth interval 411 is a relay link transmission interval for the BS 410, a relay link reception interval for the RS A 420, and a relay link transmission interval for the RS B 430. Thus, during the sixth interval 411, the BS 410 transmits a signal to the RS A 420, the RS A 420 receives a signal from the BS 410, and the RS B 430 transmits a signal to a lower RS.

A detailed description of construction and operation of an RS performing communication and transmitting/receiving control information using the frame structure described above is provided below with reference to the accompanying drawings.

Figure 5:
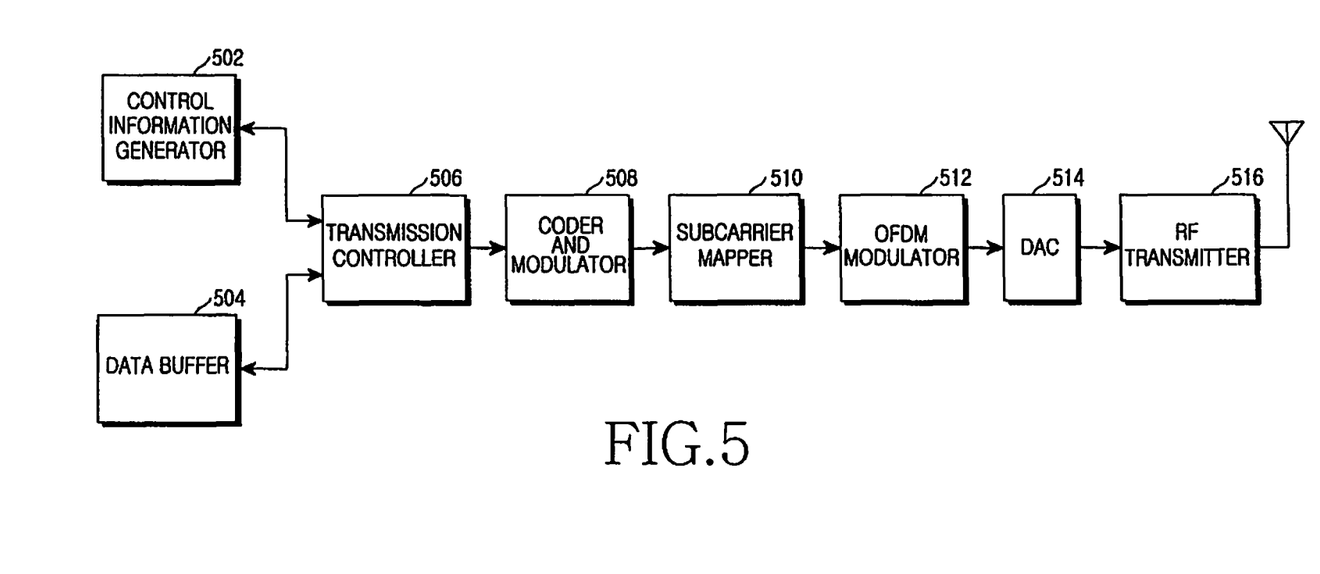
FIG. 5 is a block diagram illustrating a construction of an RS for transmitting control information in a multi-hop relay broadband wireless communication system according to an embodiment of the present invention.

FIG. 5 is a block diagram illustrating a construction of an RS for transmitting control information in a multi-hop relay broadband wireless communication system according to an embodiment of the present invention.

Referring to FIG. 5, the RS includes a control information generator 502, a data buffer 504, a transmission controller 506, a coder and modulator 508, a subcarrier mapper 510, an OFDM modulator 512, a Digital to Analog Converter (DAC) 514, and a Radio Frequency (RF) transmitter 516.

The control information generator 502 generates control information to be transmitted to a lower RS. The control information includes at least one of an R-FCH, a DL-MAP, and a UL-MAP.

The data buffer 504 stores traffic data for transmission to a lower RS and an MS communicating directly. The traffic data is received from an upper RS and a BS and is stored.

The transmission controller 506 controls a time point for transmission of control information generated in the control information generator 502 and data stored in the data buffer 504. Particularly, the transmission controller 506 controls so that the control information is transmitted to a lower RS during a first relay link transmission interval among a plurality of relay link transmission intervals distributed within a frame according to the present invention. The transmission controller 506 controls so that the traffic data is transmitted to a lower RS during a remnant interval remaining after the first relay link transmission interval and relay link transmission intervals distributed after the first relay link transmission interval. Further, the transmission controller 506 controls so that the traffic data is transmitted to an MS directly communicating during an MS link transmission interval. Here, the distribution of the relay link transmission interval and the MS link transmission interval is identified through signaling at the time of initial connection.

The coder and modulator 508 channel-codes a bit stream provided from the transmission controller 506 and converts the coded bit stream into complex symbols by modulation. The subcarrier mapper 510 maps the complex symbols to an available subcarrier zone. The OFDM modulator 512 converts the mapped complex symbols into OFDM symbols by the Inverse Fast Fourier Transform (IFFT) operation. The DAC 514 converts a digital signal provided from the OFDM modulator 512 into an analog signal. The RF transmitter 516 up-converts a baseband signal provided from the DAC 514 into an RF band signal and transmits the RF band signal to a lower RS or an MS through an antenna.

Figure 6:
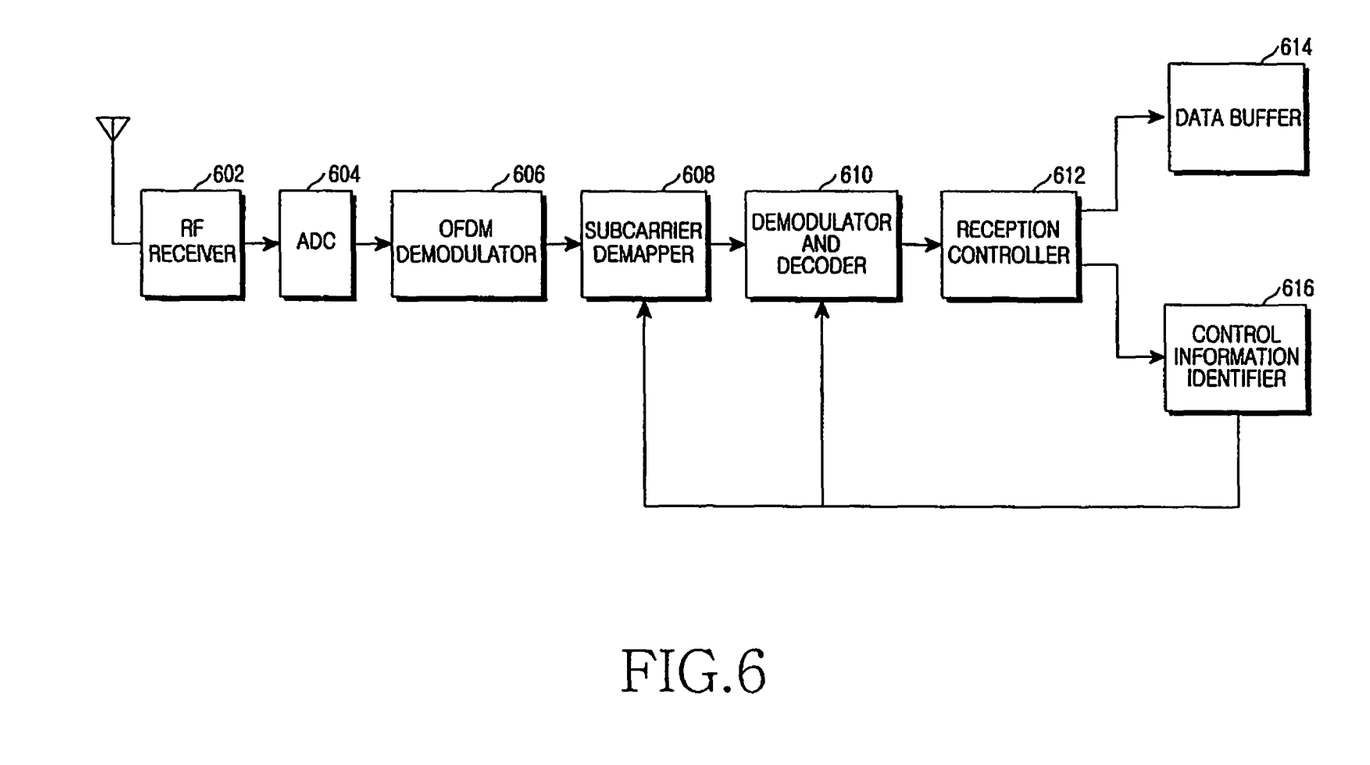
FIG. 6 is a block diagram illustrating a construction of an RS for receiving control information in a multi-hop relay broadband wireless communication system according to an embodiment of the present invention.

FIG. 6 is a block diagram illustrating a construction of an RS for receiving control information in a multi-hop relay broadband wireless communication system according to an embodiment of the present invention.

Referring to FIG. 6, the RS includes an RF receiver 602, an Analog to Digital Converter (ADC) 604, an OFDM demodulator 606, a subcarrier demapper 608, a demodulator and decoder 610, a reception controller 612, a data buffer 614, and a control information identifier 616.

The RF receiver 602_converts an RF band signal received from an upper RS through an antenna into a baseband signal. The ADC 604 samples an analog signal provided from the RF receiver 602 and converts the sampled analog signal into a digital signal. The OFDM demodulator 606 distinguishes a digital signal provided from the ADC 604 on a per-OFDM-symbol basis and converts the digital signal into complex symbols by the Fast Fourier Transform (FFT) operation. The subcarrier demapper 608 extracts a complex symbol mapped to an allocated subcarrier zone among complex symbols mapped to a subcarrier provided from the OFDM demodulator 606. The demodulator and decoder 610 converts the extracted complex symbol into an information bit stream by decoding and demodulating.

The reception controller 612 controls a time point for acquisition and classification of control information and data from a received signal. Particularly, the reception controller 612 acquires control information from a received signal during a first relay link reception interval among a plurality of relay link reception intervals distributed within a frame according to the present invention. The control information includes at least one of an R-FCH, a DL-MAP, and a UL-MAP. The reception controller 612 acquires traffic data to be transmitted to a lower RS or an MS from a received signal during a remnant interval not including the control information among the first relay link reception interval and a relay link reception interval distributed after the first relay link reception interval. Here, the distribution of the relay link reception interval is identified through signaling at the time of initial connection.

The data buffer 614 stores traffic data to be transmitted to the lower RS or the MS. The control information identifier 616 identifies the control information. For example, the control information identifier 616 identifies coding information of a relay MAP through the R-FCH and decodes the relay MAP according to the coding information. The control information identifier 616 identifies resource zone information allocated through the relay MAP and signal coding information and provides the allocated resource zone information and signal coding information to the subcarrier demapper 608 and the demodulator and decoder 610.

Figure 7:
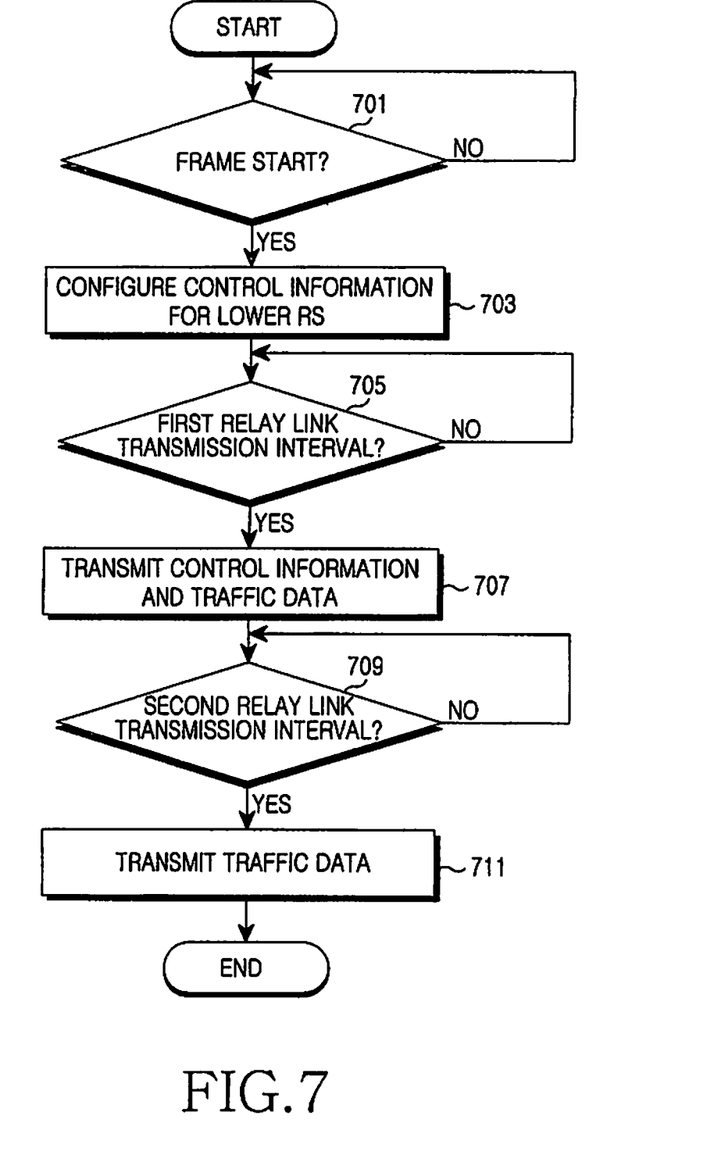
FIG. 7 is a flow diagram illustrating a control information transmission process of an RS in a multi-hop relay broadband wireless communication system according to an embodiment of the present invention.

FIG. 7 is a flow diagram illustrating a control information transmission process of an RS in a multi-hop relay broadband wireless communication system according to an embodiment of the present invention. FIG. 7 shows an operation process of an RS assuming two relay link transmission intervals within one frame. An operation process of an RS having more than two relay link transmission intervals within one frame can also be achieved in a similar way.

Referring to FIG. 7, the RS identifies whether it is a frame start interval in step 701. The frame start interval is identified through a preamble transmitted by a BS.

Then, the RS configures control information for a lower RS in step 703. The control information includes at least one of an R-FCH, a DL-MAP, and a UL-MAP.

After configuring the control information, in step 705, the RS identifies whether it is a first relay link transmission interval among at least one relay link transmission interval distributed within a frame. Here, the distribution of the relay link interval is identified through signaling at the time of initial connection. That is, before initiating a main process, the RS identifies the relay link interval distribution through signaling at the time of initial connection with an upper RS or a BS.

If it is the first relay link transmission interval, in step 707, the RS transmits the configured control information to a lower RS and transmits traffic data to the lower RS during a remnant interval remaining after the transmitting of the control information. The traffic data is in a state of being received and stored from an upper RS or a BS earlier before a transmission interval.

Then, the RS identifies whether it is a second relay link transmission interval in step 709.

If it is the second relay link transmission interval, the RS transmits traffic data to a lower RS in step 711.

Figure 8:
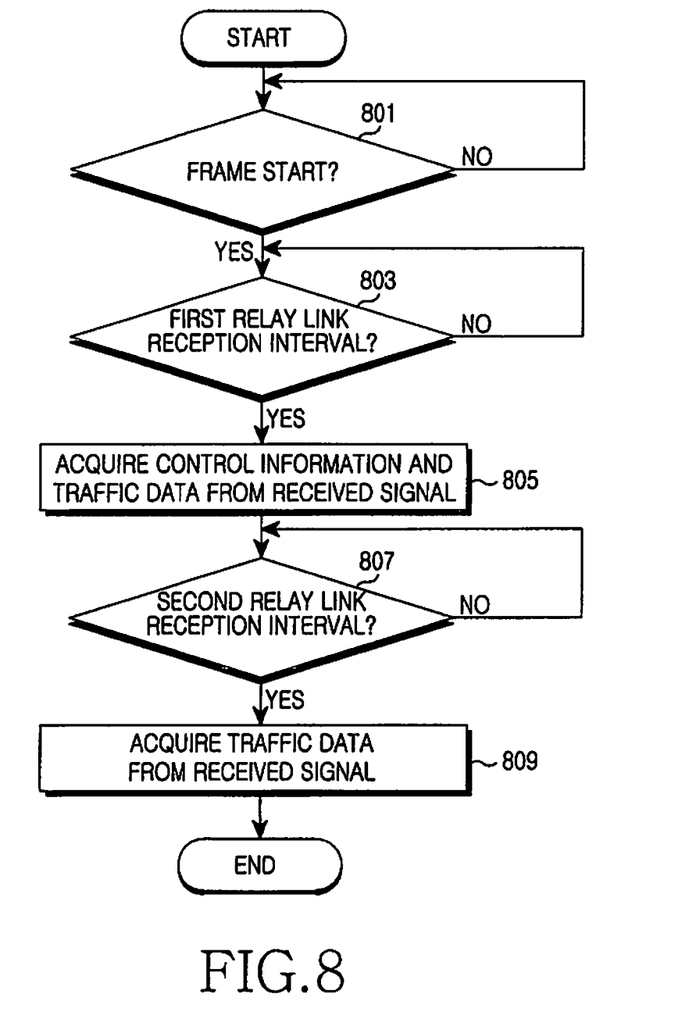
FIG. 8 is a flow diagram illustrating a control information reception process of an RS in a multi-hop relay broadband wireless communication system according to an embodiment of the present invention.

FIG. 8 is a flow diagram illustrating a control information reception process of an RS in a multi-hop relay broadband wireless communication system according to an embodiment of the present invention. FIG. 8 shows an operation process of an RS assuming two relay link reception intervals within one frame. An operation process of an RS having more than two relay link reception intervals within one frame can also be achieved in a similar way.

Referring to FIG. 8, the RS identifies whether it is a frame start interval in step 801. The frame start interval is identified through a preamble transmitted by a BS.

Then, the RS identifies whether it is a first relay link reception interval among at least one relay link reception interval in step 803. Here, the distribution of the relay link interval is identified through signaling at the time of initial connection. That is, the RS identifies the relay link interval distribution through signaling at the time of initial connection with an upper RS or a BS.

If it is the first relay link reception interval, in step 805, the RS acquires control information from a received signal during the first relay link reception interval and acquires traffic data during a remnant interval remaining after the acquiring of the control information. The control information includes an R-FCH, a DL-MAP, and a UL-MAP. The traffic data is transmitted to a lower RS or an MS communicating directly and is stored until transmission is completed.

Then, the RS identifies whether it is a second relay link reception interval in step 807.

If it is the second relay link reception interval, the RS acquires traffic data from a received signal during the second relay link reception interval in step 809. The traffic data and the control information are acquired by processing a received signal in an OFDM communication system.

As described above, the present invention fixedly transmits control information such as an MAP for an RS and an FCH during a first relay link transmission interval within a frame in a multi-hop relay broadband wireless communication system, thereby reducing an overhead for informing a position of the control information. In particular, the RS can transmit the MAP information during the first relay link transmission interval, thereby allocating all resources of the same frame to a lower RS. Further, the lower RS can receive the control information during the first relay link reception interval, thereby decoding all relay interval allocation zones within the same frame that are informed by the control information (e.g., a DL-MAP).

While the invention has been shown and described with reference to certain preferred embodiments thereof, it will be understood by those skilled in the art that various changes in form and details may be made therein without departing from the spirit and scope of the invention as defined by the claims.

What is claimed is:

1. A Relay Station (RS) apparatus in a multi-hop relay broadband wireless communication system, the apparatus comprising:
   a controller for identifying distribution of at least one relay link transmission interval of the RS within a frame by receiving a message including information that indicates the at least one relay link transmission interval of the RS at a time when the RS initially connects to an upper node; and
   a communication unit for receiving first control information for the RS from an upper node during a first relay link transmission interval among the at least one relay link transmission interval of the RS distributed within a frame, and transmitting second control information for a lower RS to the lower RS during a first relay link transmission interval among at least one relay link transmission interval of the lower RS distributed within a frame,
   wherein each of the first and second control information comprises a Relay-Frame Control Header (R-FCH), a DownLink MAP (DL-MAP), and an UpLink MAP (UL-MAP), and the at least one relay link transmission interval of the RS is at least one portion of the frame used for a relay link, and
   wherein the message includes information indicating a start point of the at least one relay link transmission interval of the RS, a length of the at least one relay link transmission interval, and a mode of the at least one relay link transmission interval of the RS, the mode indicating that a corresponding relay link transmission interval is used as one of a transmission mode where the RS transmits a signal, a reception mode where the RS receives a signal, and an idle mode where the RS suspends a transmission and a reception.

2. The apparatus of claim 1, wherein the at least one relay link transmission interval of the RS is distinguished by a time interval.

3. The apparatus of claim 1, wherein the communication unit transmits traffic data to the lower RS during the at least one relay link transmission interval of the RS.

4. The apparatus of claim 1, wherein the communication unit transmits data to a Mobile Station (MS) during an MS link interval.

5. The apparatus of claim 1, wherein the communication unit comprises:
- a coder and modulator for converting an information bit stream into a complex symbol by channel-coding and modulating;
- an Orthogonal Frequency Division Multiplexing (OFDM) modulator for transforming the complex symbol into an OFDM symbol by Inverse Fast Fourier Transform (IFFT) operation; and
- a transmitter for up converting the OFDM symbol into a Radio Frequency (RF) band signal and transmitting the RF band signal.

6. The apparatus of claim 1, wherein the communication unit further transmits, to the lower RS, traffic data via the first relay link transmission interval and additional traffic data via a second relay link transmission interval.

7. The apparatus of claim 1, wherein the first relay link transmission interval is allocated in a time period for an access link transmission interval of a Base Station (BS) where the BS transmit signal to at least one Mobile Station (MS).

8. The apparatus of claim 1, wherein the frame comprises a plurality of access link transmission intervals where the RS transmits a signal to at least one MS.

9. A Relay Station (RS) apparatus in a multi-hop relay broadband wireless communication system, the apparatus comprising:
- a controller for identifying distribution of at least one relay link transmission interval within a frame by receiving a message including information that indicates the at least one relay link transmission interval at a time when the RS initially connects to an upper node; and
- a communication unit for receiving control information during a first relay link reception interval among at least one relay link reception interval distributed within a frame, wherein the control information comprises a Relay-Frame Control Header (R-FCH), a DownLink MAP (DL-MAP), and an UpLink MAP (UL-MAP) and the at least one relay link transmission interval is at least one portion of the frame used for a relay link,
- wherein the message includes information indicating a start point of the at least one relay link transmission interval, a length of the at least one relay link transmission interval, and a mode of the at least one relay link transmission interval, the mode indicating that a corresponding relay link transmission interval is used as one of a transmission mode where the RS transmits a signal, a reception mode where the RS receives a signal, and an idle mode where the RS suspends a transmission and a reception.

10. The apparatus of claim 9, wherein the at least one relay link reception interval is distinguished by a time interval.

11. The apparatus of claim 9, wherein the controller acquires traffic data to be transmitted to a lower MS or a BS from a received signal during the at least one relay link reception interval.

12. The apparatus of claim 9, wherein the communication unit comprises:
- a receiver for down converting a received RF band signal and acquiring a baseband OFDM symbol;
- an OFDM demodulator for transforming the OFDM symbol into complex symbols by Fast Fourier Transform (FFT) operation; and
- a demodulator and decoder for converting the complex symbols into an information bit stream by demodulating and decoding.

13. The apparatus of claim 9, wherein the controller further classifies traffic data from the received signal during the first relay link reception interval and classifies additional traffic data from the received signal during a second relay link reception interval among the plurality of relay link intervals distributed within the frame.

14. The apparatus of claim 9, wherein the first relay link reception interval is allocated in a time period for an access link transmission interval of a Base Station (BS) where the BS transmit signal to at least one Mobile Station (MS).

15. The apparatus of claim 9, wherein the frame comprises a plurality of access link transmission intervals where the RS transmits a signal to at least one MS.

16. A communication method of a Relay Station (RS) in a multi-hop relay broadband wireless communication system, the method comprising:
- identifying distribution of at least one relay link transmission interval of the RS within a frame by receiving a message including information that indicates the at least one relay link transmission interval of the RS at a time when the RS initially connects to an upper node;
- receiving first control information for the RS from an upper node during a first relay link transmission interval among the at least one relay link transmission interval of the RS distributed within a frame; and
- transmitting second control information for a lower RS to the lower RS during a first relay link transmission interval of the lower RS among at least one relay link transmission interval distributed within a frame,
- wherein each of the first and second control information comprises a Relay-Frame Control Header (R-FCH), a DownLink MAP (DL-MAP), and an UpLink MAP (UL-MAP) and the at least one relay link transmission interval of the RS is at least one portion of the frame used for a relay link,
- wherein the message includes information indicating a start point of the at least one relay link transmission interval of the RS, a length of the at least one relay link transmission interval of the RS, and a mode of the at least one relay link transmission interval of the RS, the mode indicating that a corresponding relay link transmission interval is used as one of a transmission mode where the RS transmits a signal, a reception mode where the RS receives a signal, and an idle mode where the RS suspends a transmission and a reception.

17. The method of claim 16, wherein the at least one relay link transmission interval of the RS is distinguished by a time interval.

18. The method of claim 16, further comprising: transmitting traffic data to a lower RS during the at least one relay link transmission interval of the RS.

19. The method of claim 16, further comprising: transmitting data to an MS during an MS link interval.

20. The method of claim 16, wherein transmitting the second control information comprises: processing and transmitting a signal in an OFDM communication fashion.

21. The method of claim 16, further comprising:
- transmitting, to the lower RS, traffic data via the first relay link transmission interval; and
- transmitting additional traffic data via a second relay link transmission interval.

22. The method of claim 16, wherein the first relay link transmission interval is allocated in a time period for an access link transmission interval of a Base Station (BS) where the BS transmit signal to at least one Mobile Station (MS).

23. The method of claim 16, wherein the frame comprises a plurality of access link transmission intervals where the RS transmits a signal to at least one MS.

24. A communication method of A Relay Station (RS) in a multi-hop relay broadband wireless communication system, the method comprising:
   identifying distribution of at least one relay link reception interval within a frame by receiving a message including information that indicates the at least one relay link transmission interval at a time when the RS initially connects to an upper node; and
   receiving control information during a first relay link reception interval among the at least one relay link reception interval distributed within a frame,
   wherein the control information comprises a Relay-Frame Control Header (R-FCH), a DownLink MAP (DL-MAP), and an UpLink MAP (UL-MAP) and the at least one relay link transmission interval is at least one portion of the frame used for a relay link, and
   wherein the message includes information indicating a start point of the at least one relay link transmission interval, a length of the at least one relay link transmission interval, and a mode of the at least one relay link transmission interval, the mode indicating that a corresponding relay link transmission interval is used as one of a transmission mode where the RS transmits a signal, a reception mode where the RS receives a signal, and an idle mode where the RS suspends a transmission and a reception.

25. The method of claim 24, wherein the at least one relay link reception interval is distinguished by a time interval.

26. The method of claim 24, wherein converting the received signal into the bit stream comprises: processing and converting the received signal into a bit stream in an OFDM communication fashion.

27. The method of claim 24, further comprising:
   receiving traffic data during the first relay link reception interval; and
   receiving additional traffic data during a second relay link reception interval among the plurality of relay link intervals distributed within the frame.

28. The method of claim 24, wherein the first relay link reception interval is allocated in a time period for an access link transmission interval of a Base Station (BS) where the BS transmit signal to at least one Mobile Station (MS).

29. The method of claim 24, wherein the frame comprises a plurality of access link transmission intervals where the RS transmits a signal to at least one MS.

* * * * *